United States Patent Office 2,698,668
Patented Jan. 4, 1955

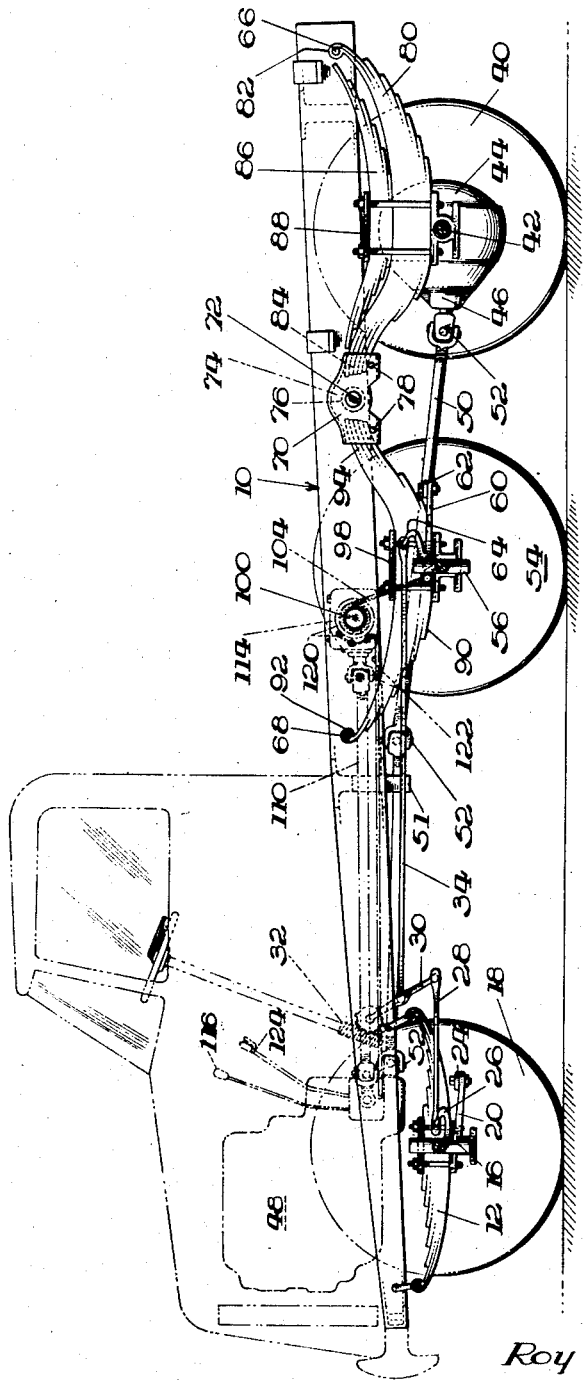

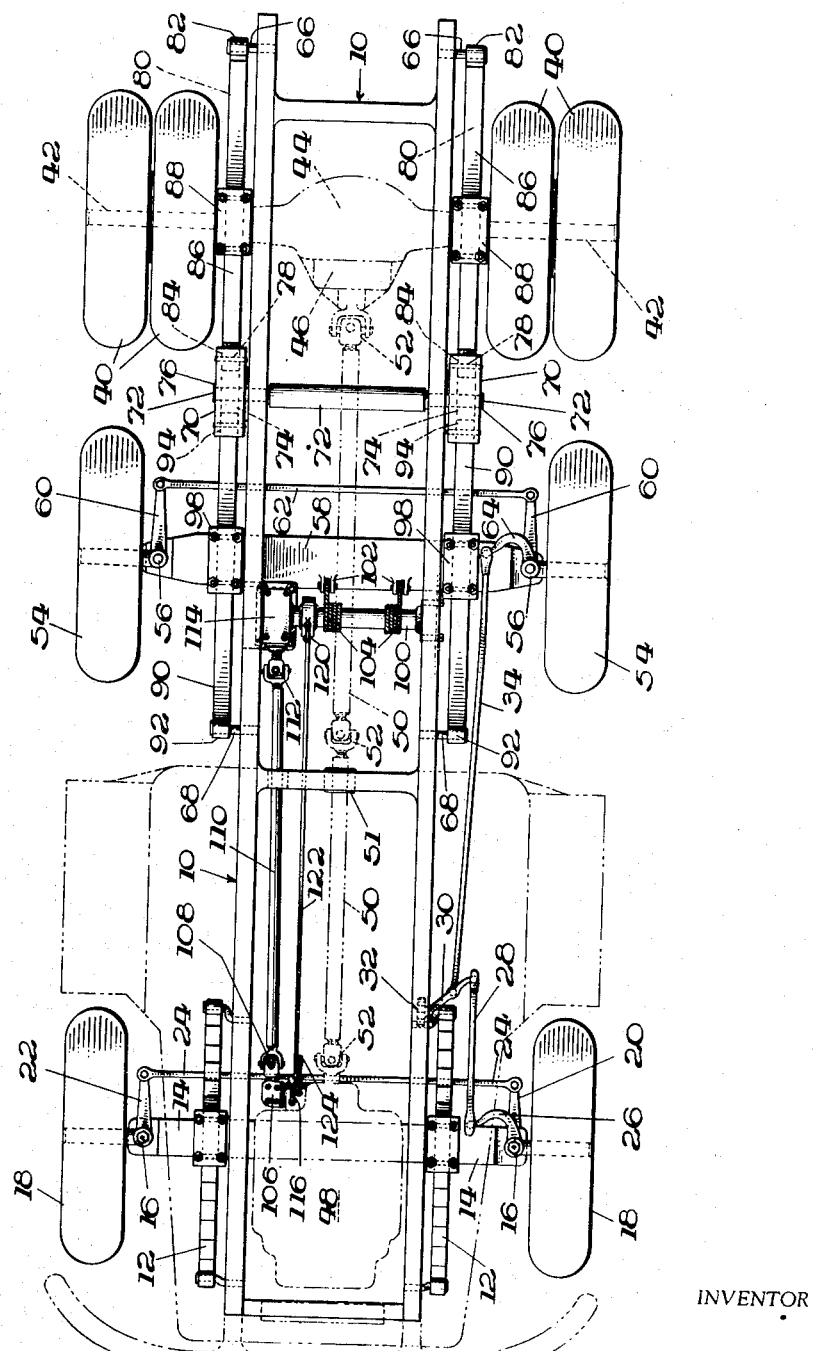

2,698,668

LOAD EQUALIZING SUSPENSION FOR TANDEM MOUNTED AXLES

Roy H. McKay, Youngstown, Ohio

Application September 10, 1952, Serial No. 308,813

2 Claims. (Cl. 180—22)

This invention relates to the running gears of motor vehicles and, more particularly, to tractors, trailers and trucks having two pairs of rear wheels, one pair having a drive axle, and the other pair having a dead axle and dirigible wheels operatively coupled to the dirigible front wheels.

Heavy duty trucks require extra wheels for supporting their increased loads, these extra wheels usually being mounted on a dead axle in tandem with the regular drive axle. By converting a four-wheel truck or other heavy duty motor vehicle to a six-wheel truck, or the like, approximately twelve thousand pounds additional weight can be carried, without increasing the size of the vehicle.

Mounting the auxiliary wheels in tandem with the drive wheels, and making them dirigible with the front wheels has the decided advantage that they will turn with the front wheels instead of pushing or sliding the front wheels on turns. As a result, there is less wear on king pins, bushings, wheel bearings and tires. Additionally, a truck with auxiliary dirigible wheels, as disclosed herein, will not skid as readily as trucks with non-dirigible auxiliary wheels, or tandem wheels, because the auxiliary dirigible wheels will turn with and follow the dirigible front wheels in any rectilinear or curvilinear path, as normally determined by the truck driver. To insure greater traction on straightaways or hills, the auxiliary dirigible wheels may be raised off the ground by suitable lift mechanisms controlled from the cab.

It is an object of the present invention to provide a novel wheel arrangement for trucks whereby a four-wheel truck body can incorporate auxiliary wheels to form a six-wheel truck with increased weight-carrying capacity.

It is also an object of the present invention to provide a novel tandem mounting for drive wheels and auxiliary rear wheels, the said wheels being mounted on axles supported on and by the middle of juxtaposed leaf springs pivotally connected at their outer ends to the chassis, and having their inner ends floating in frictional bearing engagement in the ends of a pivotally mounted rocker support.

A further object of the invention is to provide a tandem wheel mounting featured by flexible intercoupling of the wheel supports and insuring traction for the drive wheels while the auxiliary rear wheels are rising and falling over relatively great irregularities in the roadway.

Another object of the invention is to effect close coupling of the drive wheels and the auxiliary wheels, enabling the six-wheel type of chassis to employ a frame that needs to be no longer than that used for the four-wheel type.

An additional object of the invention is to connect the front and rear steering wheels in a manner that the rear steering wheels will tend to follow the track of the front steering wheels, whether such track be rectilinear or curvilinear, and the rear steering wheels cannot be deflected sufficiently to throw the rear end of the vehicle to one side or the other of the line of travel of the vehicle.

Yet another object of this invention is the provision of a multi-wheel road vehicle comprising a frame, a driven axle and a dead axle disposed adjacent one end of said frame, and compensating spring suspensions connecting said axles with said frame.

A special object of this invention is the provision of a multi-wheel road vehicle comprising a frame, a driven axle and a dead axle disposed adjacent one end of said frame, and compensating spring suspensions connecting said axles with said frame, said spring suspensions having floating bearing contact with common, frame-supported rocker members or trunnions.

Another object of this invention is the provision of a multi-wheel road vehicle comprising a frame, a driving axle and a dead axle disposed adjacent one end of said frame, said dead axle pivotally mounting auxiliary wheels dirigibly interconnected with the front dirigible wheels, compensating spring suspensions connecting said axles with said frame, and means for shifting the load carried by one axle to the other axle.

With these and other objects in view, which may be incident to my improvements, the invention consists in the parts and combinations to be hereinafter set forth and claimed, with the understanding that the several necessary elements, comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a side view of a chassis in longitudinal section, the rear wheels being removed to show the rear wheel supports and control mechanism, and Fig. 2 is a plan view of the chassis of Fig. 1.

Referring more particularly to the drawings, the chassis frame of a vehicle is indicated generally by the numeral 10. At its forward end the frame is supported on leaf springs 12 in the usual manner, the leaf springs being carried by a front axle 14. At its opposite ends the axle 14 is provided with steering knuckles 16 on which are rotatably mounted front steering wheels 18, constituting a pair. It will be seen that these wheels are dirigibly connected with the front axle.

Steering of the front wheels is effected in the usual manner, the steering knuckles 16 having rearwardly projecting arms 20, 22, respectively, to which are pivoted the opposite ends of a tie or connecting rod 24. One of the steering knuckles 16 is provided with a second arm 26, which is connected to a drag link 28 controlled by and pivotally connected to a link 30 which is operatively connected to and oscillated by the steering mechanism, indicated generally by the number 32. One end of a connecting rod or drag link 34 is pivotally connected at the center of member 30, and at its other end to the steering mechanism of an auxiliary pair of dirigible wheels, all as will be described more in detail hereinafter.

The rear drive wheels comprising opposed pairs, designated generally by the numeral 40 are mounted on and driven by a drive shaft or axle 42 housed in casing 44 which casing also incorporates a differential housing 46, the differential and gear connections to the drive axle 42 not being shown. The differential is connected to the engine 48 by a two-part drive shaft 50, whose parts are connected to each other and to the engine shaft and to the differential, respectively, by universal joints, designated generally by the numeral 52. The forward segment of drive shaft 50 may be journaled in hanger bearing 51, as shown.

The auxiliary dirigible wheels 54 are mounted on steering knuckles 56 which are secured to opposite ends of a fixed or so-called dead shaft 58. Drag links 60 interconnect the steering knuckles 56 by means of a doubly pivoted connecting or tie rod 62. One of the steering knuckles 56 is provided with a second arm 64 which is pivotally connected to the other end of connecting rod 34, hereinabove described, whereby the two sets of dirigible wheels, front and rear, are operatively interconnected. It will be seen that the two sets of dirigible wheels form a chassis support of relatively short wheel base, and because of the interlinkage with the steering mechanism the wheels will follow substantially identical rectilinear and curvilinear paths. Accordingly, the front wheels will not be subject to pushing or sliding on turns, caused by the inertia of the vehicle body as transmitted through the non-dirigible rear wheels, whether driven or dead, the normal tendency of a moving weighted body being to travel in a straight line and to resist any change in direction. The special mounting of the rear wheels, both dirigible and non-dirigible or driven, and their interconnection, which forms a special feature of the invention herein, will now be described.

The side members of the chassis frame are provided with aligned pairs of studs, designated generally by the numerals 66, 68. These sets of studs form the end pivotal hangers for the leaf springs mounted on the axles carrying the rear drive wheels and the auxiliary steering wheels, respectively. The inner ends of the sets of leaf springs are received in pivoted trunnions 70 mounted for rotation on trunnion shaft 72 which extends across and beyond the side members of the chassis frame. The trunnions 70 are inverted channel sections having a curvilinear top and depending side walls. The side walls have aligned apertures 74, receiving shaft 72, the outer ends of which are peened over the outer side walls, as indicated at 76, whereby the trunnions are fixedly secured on and to the side members of the chassis frame. Pairs of spaced, parallel pins 78 are mounted in and across the lower portions of the side walls of the trunnions adjacent the ends thereof. The pins 78 may serve as supports for hollow rollers, not shown.

The leaf springs supported on and by the rear wheel drive axle housing 44, are bowed upwardly and are designated generally by the numeral 80. The outer or rear ends of these springs are severally provided with hanger loops 82 which are pivotally secured on the rearmost studs 66, hereinabove described. The forward ends 84, of springs 80, are not secured and rest on the rearmost sets of transverse pins or rollers 78 of the trunnions 70. Separate sets of leaf springs 86 are mounted on top of the springs 80, and the assemblies are firmly clamped together and fixedly secured to the ends of the drive axle housing 42, by any suitable means, such as clamping yokes, as shown, and designated generally by the numeral 88. It is to be noted that the yokes are secured to the middle of the bowed leaf springs 80, which are fixedly pivoted at their rear ends 82, while the forward ends 84 are floating in the trunnions 70.

Companion sets of reversely mounted leaf springs 90 are mounted on dead axle 58 of the dirigible rear wheels 54 in the following manner:

The outer or forward ends of these springs are severally provided with hanger loops 92 which are pivotally secured on the foremost studs 68, hereinabove described. The rear ends 94, of springs 90, are not secured and rest on the foremost sets of transverse pins or rollers 78 of the trunnions 70. The leaf spring assemblies 90 are severally clamped together and fixedly secured to the ends of dead axle 58, by any suitable means, such as clamping yokes, as shown, and designated generally by the numeral 98. The yokes 98 are secured to the middle of the bowed leaf springs 90, which are fixedly pivoted at their forward ends 92, while the rear ends 94 are floating in the trunnions 70.

The special spring suspension and mounting of the tandem sets of rear wheels makes them truly floating and insures a maximum tractive effort when the vehicle is in operation. Thus, under unfavorable road conditions, that is to say, a bumpy or uneven road surface, when a forward power impulse is applied to the rear driven wheels, by reason of such uneven road surface, the instantaneous reaction to the forward impulse is transmitted to the parallel suspension springs 80, and the forward ends thereof, seated in the socketed trunnion members, tend to move downwardly against the cooperating bearing members 78 of the rocker trunnions 70. Since the forward end of each of the springs substantially fills the socket portion of the trunnion, the force transmitted to the trunnion by the spring causes the trunnion to rock about its pivot in the direction of the force, the wheels being eased upwardly so as to skim along the ground or just clear the ground, whereby the weight of the rear end of the vehicle is transferred to the rear drive wheels 40, automatically insuring the maximum tractive effort.

The automatic transfer of the weight carried by the auxiliary dirigible wheels 54 to the rear drive wheels 40 makes for smooth riding on bumpy roads, and eliminates undue jarring of the vehicle and its load, as well as reducing wear on the vehicle parts and on the driving mechanism.

When it is desired, for any purpose, to operate the six-wheel vehicle, described immediately above, as a four-wheel vehicle, the dead axle 58, carrying the auxiliary dirigible wheels 54, is raised by any suitable means and fixedly held in the raised position, whereby the auxiliary wheels are lifted off the ground. One system for effecting this operation, and at the control of the driver, even when rolling along the road, will now be described:

A winch drum 100 is journaled between the side frame members of chassis 10, and at a distance above dead axle 58 of the auxiliary wheels. The axle 58 is provided with spaced lugs 102 to which are secured the ends of cables 104, the latter being wound, in spaced relation on drum 100. The drum is driven by a suitable power take-off from the engine, comprising a clutch means, not shown, which is connected through bevel gears, in a gear housing 106, to a universal joint 108, coupled to one end of a winch drive shaft 110, the other end of which is coupled through universal joint 112 and gear box 114, to the winch drum 100. A control lever or clutch 116, in the driver's cab, permits direct control of this system, even while the vehicle is running. To lock the winch drum in place in either wheels-down or wheels-up position of the auxiliary wheel shaft 58, there is provided a brake drum 120 engaging the winch drum 100, as shown. A brake rod 122 connects the drum 120 with brake lever 124, which is mounted in the driver's cab adjacent the winch control or clutch lever 116.

It will be seen that the improvements of the invention herein permit the operation of what would normally be a four-wheel vehicle as a six-wheel vehicle, thereby raising the load-carrying capacity by as much as six tons per vehicle. It will also be seen that the novel vehicle herein can be converted, at will, and while running on the road, even under full load, from a six-wheel truck to a four-wheel truck and vice-versa, any such conversion being effected by operation of suitable control levers in the driver's cab.

Additionally, it is to be noted that the extra set of load-bearing tandem wheels, apart from their cooperation with the drive wheels as duplex load-bearing members, subserve the useful function of extra dirigible wheels. These wheels being in advance of the rear drive wheels, and being operatively coupled to the front dirigible wheels, provide a shortened wheel base for the turning of the vehicle, and eliminate the normal tendency of rear drive wheels to cause front dirigible wheels to slide, skid, or otherwise misperform on turns, or on slippery roads. Any tendency of the drive wheels, due to the inertia of the moving vehicle, to force the vehicle to continue in a path opposite to the path assumed by the dirigible front wheels, is effectively overcome by the positioning of a second pair of auxiliary dirigible wheels immediately in advance of the rear drive wheels. The drive wheels and the auxiliary dirigible wheels act, in effect, as a single set of wheels, whose forward travel, as a single load-bearing entity is determined by the auxiliary dirigible wheels.

The floating connection of the cooperating load-bearing tandem wheels with the chassis frame, and the novel spring mountings which make such floating connection possible, tends to effectively eliminate the transmission of all shocks, jars, and other disturbances due to road conditions, from the wheels to the vehicle body, thereby resulting in smoother riding conditions, even on poor or bumpy roads, with a resulting improvement in the load-carrying capacity of the vehicle, and reduction or elimination of breakage or other damage to the goods comprising the vehicle load.

While I have shown a winch lift for raising or lowering the auxiliary dirigible wheels 54, it will be appreciated that the dead axle may be raised or lowered by means of a combination of levers and cams or hydraulically.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. In a vehicle, including a frame, having a front axle, a pair of rear axles, ground wheels rotatable upon said axles, means for driving the rear ground wheels, and means for dirigibly mounting ground wheels on the said front axle and the intermediate axle, the said front and rear dirigible wheels being dirigibly controlled by a common steering mechanism; the improvement comprising pairs of springs severally secured intermediate their ends to the driven rear axle and to the non-rotatable intermediate axle; spindles secured to the vehicle frame and pivotally mounting the outer ends of each said pair of springs; and means mounting said springs for independent equalization on opposite sides of the frame comprising a shaft extending across and through the frame members and mounting rocker members on the ends thereof, said rocker members having opposed sockets receiving inner ends of the said springs in free sliding contact, said inner ends of the springs filling the sockets.

2. In a vehicle having a chassis, a front axle, a pair of rear axles, ground wheels rotatable upon said axles, means for driving the rear ground wheels, means for dirigibly mounting the ground wheels on the said front axle and on the intermediate axle, said front and rear dirigible wheels being dirigibly controlled by a common steering mechanism, and means for optionally raising and lowering the intermediate axle, whereby to raise and lower the rear dirigible ground wheels, the improvement comprising torque-responsive means for intermittently and automatically raising the intermediate axle in response to irregularities in the road surface, including leaf springs severally secured intermediate their ends to the driven rear axle and to the non-rotatable intermediate axle, and pivotally connected at their outer ends to the chassis; trunnion means pivotally mounted on a common shaft secured in the chassis frame intermediate the pivotal connections of the outer ends of said leaf springs; and means for mounting said springs for independent equalization comprising rocker members at the ends of said trunnions, said rocker members having opposed sockets receiving the inner ends of the springs in free sliding contact, said inner ends of the springs filling the sockets.

References Cited in the file of this patent

UNITED STATES PATENTS

| | | |
|---|---|---|
| 878,156 | Pratt | Feb. 4, 1908 |
| 2,065,924 | Knox | Dec. 29, 1936 |
| 2,251,360 | Knox | Aug. 5, 1941 |
| 2,391,948 | Couse | Jan. 1, 1946 |
| 2,636,743 | Frazier | Apr. 28, 1953 |

FOREIGN PATENTS

| | | |
|---|---|---|
| 302,893 | Italy | Nov. 11, 1932 |